US009055449B2

(12) United States Patent
Silverman et al.

(10) Patent No.: US 9,055,449 B2
(45) Date of Patent: Jun. 9, 2015

(54) EXPLICIT AND IMPLICIT HYBRID BEAMFORMING CHANNEL SOUNDING

(71) Applicant: Cisco Technology, Inc., San Jose, CA (US)

(72) Inventors: Matthew A. Silverman, Shaker Heights, OH (US); Jeffrey R. Adams, Louisville, OH (US); David Kloper, Santa Clara, CA (US); Yanxin Na, Plano, TX (US); Narayan Vishwanathan, San Diego, CA (US); Daniel Wee, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 13/691,912

(22) Filed: Dec. 3, 2012

(65) Prior Publication Data

US 2014/0154992 A1    Jun. 5, 2014

(51) Int. Cl.
*H04B 1/00* (2006.01)
*H04B 15/00* (2006.01)
*H04W 16/28* (2009.01)

(52) U.S. Cl.
CPC ..................................... *H04W 16/28* (2013.01)

(58) Field of Classification Search
CPC .................................................... H04W 16/28
USPC ................. 455/63.4, 63.1, 272, 279.1, 562.1, 455/575.7
See application file for complete search history.

(56) References Cited

U.S. PATENT DOCUMENTS

| | | |
|---|---|---|
| 6,496,535 B2 | 12/2002 | Xu |
| 6,785,520 B2 | 8/2004 | Sugar et al. |
| 6,834,076 B2 | 12/2004 | Xu |
| 6,873,651 B2 | 3/2005 | Tesfai et al. |
| 7,068,977 B1 | 6/2006 | Yang et al. |
| 7,620,423 B2 | 11/2009 | Jin et al. |
| 7,924,957 B2 | 4/2011 | Jin |
| 8,040,831 B2 | 10/2011 | Kurtz et al. |
| 8,059,744 B2 | 11/2011 | Jin et al. |

(Continued)

OTHER PUBLICATIONS

IEEE Computer Society, "Part 11: Wireless LAN Medium Access Control (MAC) and Physical Layer (PHY) Specifications," IEEE Standard for Information technology—Telecommunications and information exchange between systems Local and metropolitan area networks—Specific requirements, IEEE Std. 802.11™-2012, Section 20.3.12, pp. 1727-1735, Mar. 29, 2012.

*Primary Examiner* — Eugene Yun
(74) *Attorney, Agent, or Firm* — Edell, Shapiro & Finnan LLC

(57) ABSTRACT

A channel sounding scheme is presented herein that relies on a combination of a first channel sounding procedure and a second channel sounding procedure. The first channel sounding technique is one that involves an exchange of dedicated channel sounding related signals to determine channel conditions between the first wireless communication device and the particular second wireless communication device. The second channel sounding technique is one in which channel conditions are implicitly discovered from any signals transmitted by the particular second wireless communication device to the first wireless communication device. A first wireless communication device computes updates to steering matrix information used for beamforming one or more signal streams to a particular second wireless communication device based on a combination of the first channel sounding technique and the second channel sounding technique.

25 Claims, 4 Drawing Sheets

(56) References Cited

U.S. PATENT DOCUMENTS

| | | |
|---|---|---|
| 8,116,698 B2 | 2/2012 | Hedayat et al. |
| 8,134,503 B2 | 3/2012 | Na et al. |
| 8,195,240 B2 | 6/2012 | Jin et al. |
| 8,223,735 B2 | 7/2012 | Wang et al. |
| 8,254,845 B2 | 8/2012 | Na et al. |
| 8,280,426 B2 | 10/2012 | Guo et al. |
| 8,638,875 B1 * | 1/2014 | Zhang et al. .................. 375/295 |

* cited by examiner

EXPLICIT AND IMPLICIT HYBRID BEAMFORMING CHANNEL SOUNDING

TECHNICAL FIELD

The present disclosure relates to wireless communication networks and devices.

BACKGROUND

In wireless communication systems in which wireless devices have multiple antennas and use beamforming techniques, the device on at least one end (or both ends) of a wireless link computes beamforming weights that are used when sending a transmission. When one device on the link is mobile, it is useful to update the beamforming weights to account for changing conditions in the wireless channel between the two devices.

Channel sounding is a procedure whereby a first device learns information about the wireless channel with respect to a second device, so that the first device can update its beamforming weights appropriately for use when sending a transmission to the second device. Some wireless communication systems operate in accordance with a wireless communication standard, e.g., the IEEE 802.11 standard for wireless local area networks (WLANs). The IEEE 802.11 standard specifies what is called an "explicit" beamforming feedback sounding procedure in which an access point (AP) and a client device follow a particular exchange of signals to convey information to the AP about the wireless channel between the AP and the client device.

DESCRIPTION OF EXAMPLE EMBODIMENTS

Overview

Figure 1:
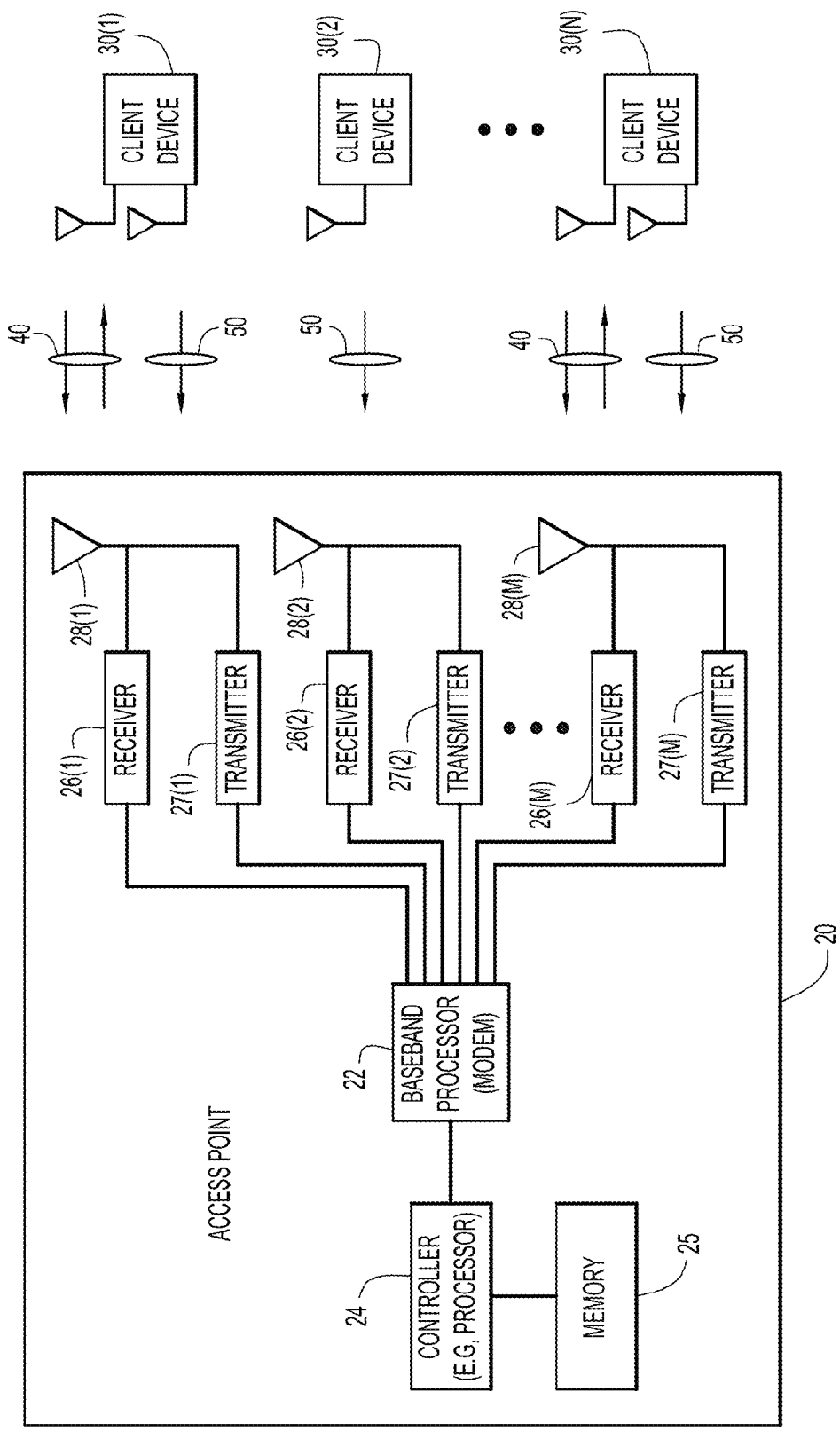
FIG. 1 is a block diagram of a wireless communication system in which a first wireless communication device is configured to perform a hybrid of a first channel sounding technique and a second channel sounding technique with respect to one of a plurality of second wireless communication devices.

A channel sounding scheme is presented that relies on a combination of a first channel sounding procedure and a second channel sounding procedure. A first wireless communication device, having a plurality of antennas and capable of wirelessly communicating with one or more second wireless communication devices having one or more antennas, computes updates to steering matrix information used for beamforming one or more signal streams to a particular second wireless communication device based on a combination of the first channel sounding technique and the second channel sounding technique. The first channel sounding technique is one that involves an exchange of dedicated channel sounding related signals to determine channel conditions between the first wireless communication device and the particular second wireless communication device. The second channel sounding technique is one in which channel conditions are implicitly discovered from any signals transmitted by the particular second wireless communication device to the first wireless communication device.

Example Embodiments

A hybrid of first and second channel sounding techniques is presented for use between first and second wireless communications devices, where the first wireless communication device is configured to beamform transmissions to the second wireless communication device via a plurality of antennas of the first wireless communication device. The first wireless communication device uses a steering matrix to weight one or more signal streams across its plurality of antennas to be beamformed to the second wireless communication device. The first wireless communication device may be, for example, a wireless access point (AP) that is configured to wirelessly communicate with any one or more second wireless communication devices, e.g., client devices. Updates to the steering matrix information used for beamforming one or more signal streams to a particular second wireless communication device is based on a combination of the first channel sounding technique and the second channel sounding technique.

The first channel sounding technique involves an exchange of dedicated channel sounding related signals to determine channel conditions between the first wireless communication device and the particular second wireless communication device. The second channel sounding technique is one in which channel conditions are implicitly discovered from any (uplink) signals transmitted by the particular second wireless communication device to the first wireless communication device.

The following description makes reference to the IEEE 802.11 wireless communication standard, by way of example only. The 802.11n specification defines several beamforming modes, including an "explicit" mode and an "implicit" mode.

The IEEE 802.11 implicit channel sounding procedure involves an AP requesting a client device to send a specific sounding frame that does not carry any data, and this sounding procedure only works when both the AP and client device support the standard-based implicit sounding procedure. Similarly, the 802.11 explicit sounding procedures require specific support on both the AP and client device, and the use of specific frames transmitted between the AP and client. An AP can support none, one, or all the beamforming channel sounding modes in the 802.11 specification. A client device may not support the explicit sounding procedure of the 802.11 standard.

In the hybrid channel sounding scheme presented herein, the first channel sounding technique may be the 802.11 explicit sounding procedure. The second channel sounding technique is one in which the channel conditions are determined from any (uplink) signals transmitted by the client device to the AP in the normal course of data transfer, and does not require any specific participation/support from the client device.

It should be understood that these techniques are not limited to an IEEE 802.11 WLAN, and may be used in any wireless communication system that employs beamforming techniques, such as the Long Term Evolution (LTE) wireless communication standard, etc.

The weaknesses/strengths of each of these sounding techniques compliment one another. Enabling only one method per radio or per client device leaves holes in the solution, even for client devices that fully support the first channel sounding technique.

For client devices that fully support the first channel sounding technique, channel overhead is still required for sounding if only using the first channel sounding technique. In certain cases of high aggregation, this overhead may not be noticeable. But in many traffic scenarios with numerous client devices, sounding before every downlink transmission can be cumbersome. The second channel sounding technique is guaranteed to have full channel sounding for (single antenna, single spatial stream, i.e., 1×1) client devices upon receiving each acknowledgement (ACK) frame, so spending any channel resources primarily for sounding those client devices is wasteful. Furthermore, for most situations, the second channel sounding technique will yield full channel sounding even for client devices that receive more than one spatial stream. Spending channel resources primarily to sound those client devices is also wasteful.

From a channel sounding perspective, the first channel sounding technique provides a benefit over the second channel sounding technique only when sounding the channel to a multiple spatial stream client device (which is capable of supporting the first channel sounding technique) when the uplink signals are not sufficiently sounding the channel (e.g., when the client data rate shifts to fewer than the maximum number of spatial streams, when there are uplink signals as in pure User Datagram Protocol (UDP) traffic, etc.).

One disadvantage of the first channel sounding technique is that the beamformee (client device) determines the precoding that the AP will use in beamforming on the downlink. Many client devices will have sub-optimal precoding computation capability. The second channel sounding technique, with the computation performed by the AP (in software, for example) has much greater flexibility in approaching optimal precoding. Thus, the hybrid channel sounding scheme presented herein uses two different types of channel sounding techniques concurrently to leverage their respective advantages.

Reference is now made to FIG. 1. FIG. 1 illustrates an example of a block diagram of a system 10 comprising a first wireless communication device 20 (e.g., an AP) and a plurality of second wireless communication devices (e.g., client devices) 30(1)-30(N).

The first wireless communication device 20 comprises a baseband processor (e.g., modem) 22, a controller 24, memory 25, a plurality of receivers 26(1)-26(M), a plurality of transmitters 27(1)-27(M) and a plurality of antennas 28(1)-28(M). Each receiver is coupled to a corresponding one of the antennas 28(1)-28(M) and each transmitter is coupled to a corresponding one of the antennas 28(1)-28(M). That is, receiver 26(1) and transmitter 27(1) are coupled to antenna 28(1), receiver 26(2) and transmitter 27(2) are coupled to antenna 28(2), and so on.

Each receiver 26(1)-26(M) converts a signal detected by its associated antenna to an antenna-specific (baseband) receive signal that is supplied to the baseband processor 22. The baseband processor 22 performs baseband processing on the antenna-specific (baseband) receive signals. The baseband processor 22 also generates a plurality of antenna-specific (baseband) transmit signals, each of which is supplied to a corresponding one of the transmitters 27(1)-27(M). The baseband processor 22 may be implemented in hardware by digital logic gates, in the form of one or more application specific integrated circuits (ASICs). Alternatively, the baseband processor 22 may be implemented as a general purpose processor that executes software.

The controller 24 is, for example, a microprocessor or microcontroller that performs high level control functions of the first wireless communication device 20. For example, the controller 24 may execute one or more software programs stored in the memory 26 for performing its control functions. The controller 24 may also supply the raw data to the baseband processor 22 to be baseband modulated/formatted for transmission via the transmitters 27(1)-27(M) and consumes the data contained in the antenna-specific (baseband) receive signals recovered by the baseband processor 22.

The memory 25 may comprise read only memory (ROM), random access memory (RAM), magnetic disk storage media devices, optical storage media devices, flash memory devices, electrical, optical, or other physical/tangible memory storage devices. In general, the memory 25 may comprise one or more tangible (non-transitory) computer readable storage media (e.g., a memory device) encoded with software comprising computer executable instructions and when the software is executed (by the controller 24) it is operable to perform the operations described herein. Either the baseband processor 22 or controller 24, or a combination of both, may be configured to perform the hybrid channel sounding techniques presented herein.

The first wireless communication device 20 can communicate with any one or more of the second wireless communication devices 30(1)-30(M), e.g., according to the rules of the IEEE 802.11 specification. Each of the second wireless communication devices 30(1)-30(M) has one or a plurality of antennas. For example, wireless communication device 30(1) has two antennas, wireless communication device 30(2) has one antenna and wireless communication device 30(N) has two antennas.

In terms of sounding the wireless channel with respect to any second wireless communication device, the first wireless communication device 20 uses a hybrid of the aforementioned first channel sounding technique or second channel sounding technique. For example, FIG. 1 shows the first channel sounding technique at reference numeral 40 and the second channel sounding technique at reference numeral 50. In particular, FIG. 1, shows that client devices 30(1) and 30(N) are each capable of performing the first channel second technique, where client device 30(2) is not. Thus, the first wireless communication device 20 has two sounding procedures available for client devices 30(1) and 30(N), and only one available for client device 30(2).

As explained above, the first channel sounding technique may be the 802.11 explicit sounding procedure and the second channel sounding technique is one in which the channel conditions are determined from any (uplink) signals transmitted by a second wireless communication device to the first wireless communication device in the normal course of data transmissions.

As explained in more detail hereinafter, the AP computes updates to steering matrix information used for beamforming one or more signal streams to a particular client device based on a combination of a first channel sounding technique that involves an exchange of dedicated channel sounding related signals to determine channel conditions between the AP and the particular client device and a second channel sounding technique in which channel conditions are implicitly discovered from any signals transmitted by the particular client device to the AP.

FIGS. 2-5 will now be referred to for a more detailed presentation of the hybrid channel sounding scheme comprising non-standard implicit multiple spatial stream beamforming (i.e., the second channel sounding technique) with coordinated explicit sounding (i.e., the first channel sounding technique). For client devices that do not support the first channel sounding technique (e.g., explicit beamforming feedback), the second channel sounding scheme is used exclusively. For all other client devices, the following scheme is used.

Figure 2:
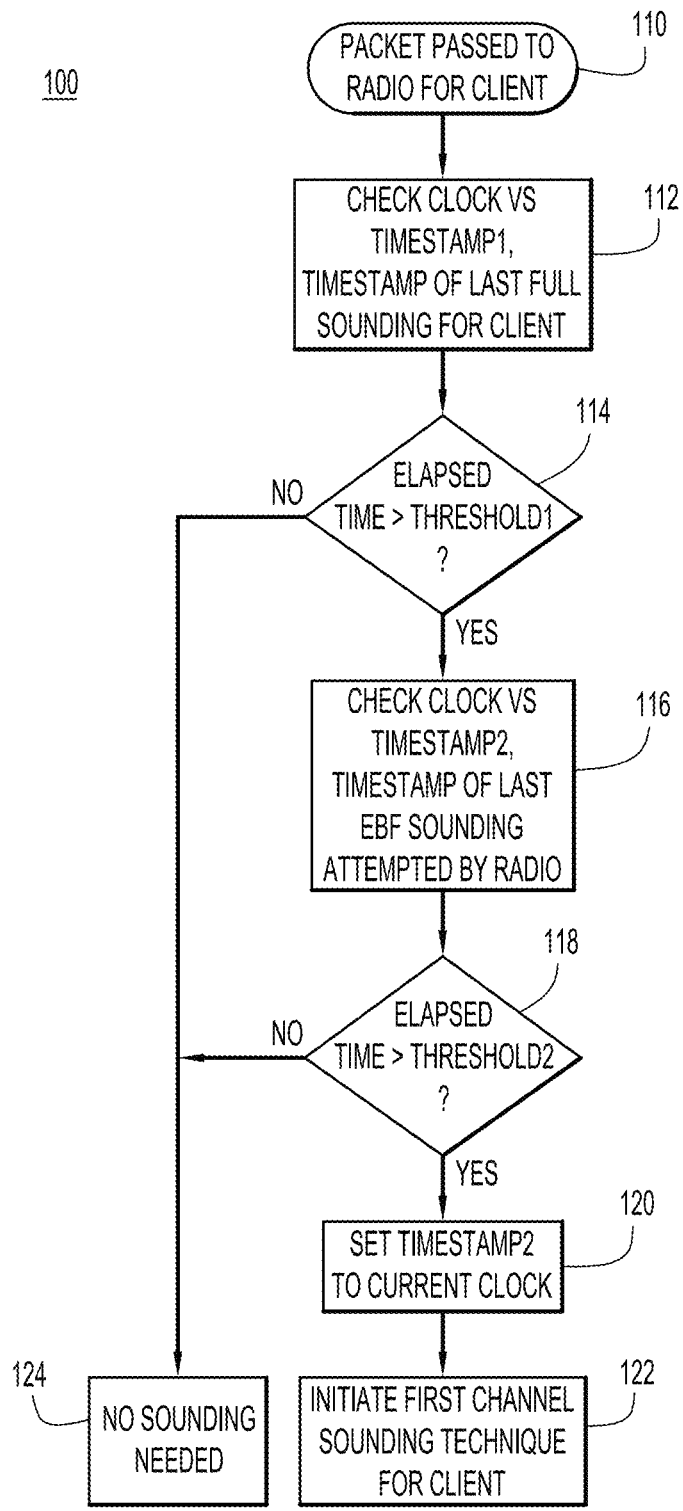
FIG. 2 is a flow chart depicting a procedure for limiting overhead associated with the first channel sounding technique.

Limiting Explicit Beamforming Sounding (First Channel Sounding Technique) Overhead Referring now to FIG. 2 (with continued reference to FIG. 1), a process 100 is described for limiting overhead associated with the first channel sounding technique performed in the first wireless communication device 20 (e.g., AP). The operations described with reference to FIG. 2 may be performed by the baseband processor 22 or controller 24. At 110, unicast or multi-user packets are passed down from the host (e.g., the controller 24) to the baseband processor 22. Several operations are performed to determine if certain conditions are met before initiating a sounding exchange according to the first channel sounding technique. First, it is determined whether the destination media access control (MAC) address for the transmission is associated with a client device that the AP 10 knows, from prior exchanges with that client device, supports the first channel sounding technique.

It is also determined whether the destination MAC address (or beamforming slot identifier) has stale beamforming weights, i.e., a stale steering matrix. Timestamps are tracked when updates to the steering matrix are made. This prioritizes available sounding overhead for client devices that need a steering matrix update. A steering matrix can be deemed "stale" (done individually for each bandwidth of 20 MHz/40 MHz/80 MHz/160 MHz, though an update to a given bandwidth is also an update to all sub-bandwidths) if it has been greater than X microseconds since the last full steering matrix update, where X is the same for all client devices and is set to a general channel coherence time target value, or X is set individually for each client device and is equal to an estimation of each client device's coherence time.

Thus, at 112, the clock of the AP 20 is compared with a timestamp1 corresponding to the time at which the last full sounding was made for that client device to determine an elapsed time. At 114, this elapsed time is compared with a first threshold (threshold1), and if this first threshold is not exceeded, then there is no need to do a sounding, as indicated at 124 in FIG. 1. On the other hand, if the elapsed time does not exceed the first threshold, then the process continues. Thus, upon queuing of data to be transmitted or at transmit time of the data to the particular client device, the AP determines whether a first period of time has elapsed since execution of the first channel sounding technique for the particular client device. The determination as to whether the first period of time has elapsed is based on a coherence time of a wireless channel between the AP and the particular client device.

At 116, the elapsed time since the AP 20 made an explicit beamforming (EBF) sounding exchange (i.e., the first channel sounding technique) to any client device is determined. At 118, this elapsed time is compared to a second threshold (threshold2). If this second threshold is not exceeded, then there is no need to do a channel sounding and the process ends at 124. On the other hand, if the second threshold is exceeded, the process continues. Operations 116 and 118 are performed to ensure that the sounding overhead is limited to a certain target. For example, the attempted downlink data rate of a packet is at least some data rate Z. This further prioritizes allocation of sounding overhead to client devices that need it. A 3×3 (three antenna, three spatial stream) client device that will not support anything close to a three spatial stream data rate on the downlink will not benefit from a fully sounded channel.

In summary, when it is determined that the first period of time has elapsed since the first channel sounding technique has been performed for the particular client device, it is further determined whether a second period of time has elapsed since execution of the first channel sounding technique by the AP for any client device. The first channel sounding technique is executed for the particular client device when it is determined that the second period of time has elapsed since the first channel sounding technique has been performed by the AP for any client device.

In a variation, when it is determined that the second period of time has elapsed since the first channel sounding technique has been performed by the AP for any client device, the AP sends to the particular client device a frame configured to trigger initiation of the first channel sounding technique or second channel sounding technique.

At 120, a timestamp, timestamp2, is updated to the current time of the AP's clock in order to timestamp the time when the first channel sounding technique is invoked. At 122, the first channel sounding technique is initiated by the AP, e.g., the AP sends a Null Data Packet Announcement (NDPA) according to IEEE 802.11 to initiate an explicit beamforming feedback channel sounding procedure for that client device.

Figure 3:
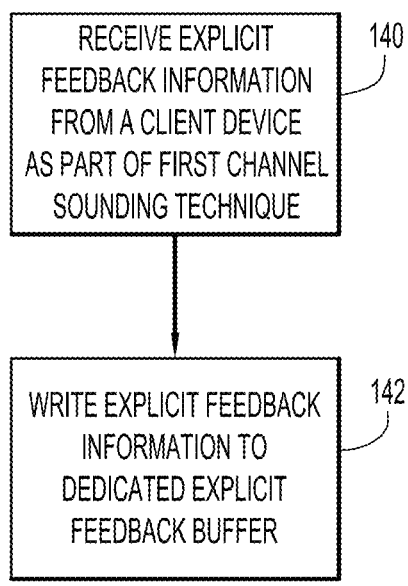
FIGS. 3 and 4 are flow charts illustrating examples of handling channel information resulting from the first and second channel sounding techniques, respectively.
Figure 4:
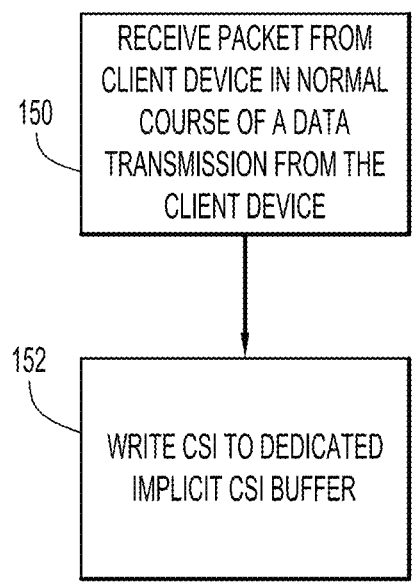

Turning to FIGS. 3 and 4, handling of channel information from either sounding technique is now generally described. In FIG. 3, at 140, the AP 20 receives explicit beamforming feedback from a client device as part of the first channel sounding technique. At 142, the AP writes the explicit feedback information to a dedicated explicit feedback buffer to retain the explicit sounding feedback information transmitted by a client device to the AP resulting from execution of the first channel sounding technique. In FIG. 4, at 150, when the AP receives a packet from a client device in the normal course of a data transmission from the client device to the AP, the AP computes channel state information (CSI) based on reception of the packet on its multiple antennas as part of the second channel sounding technique. At 152, the AP writes the CSI to a dedicated implicit CSI buffer. Thus, the AP retains CSI that it generates resulting from execution of the second channel sounding technique.

Mixing First and Second Channel Sounding Techniques

Figure 5:
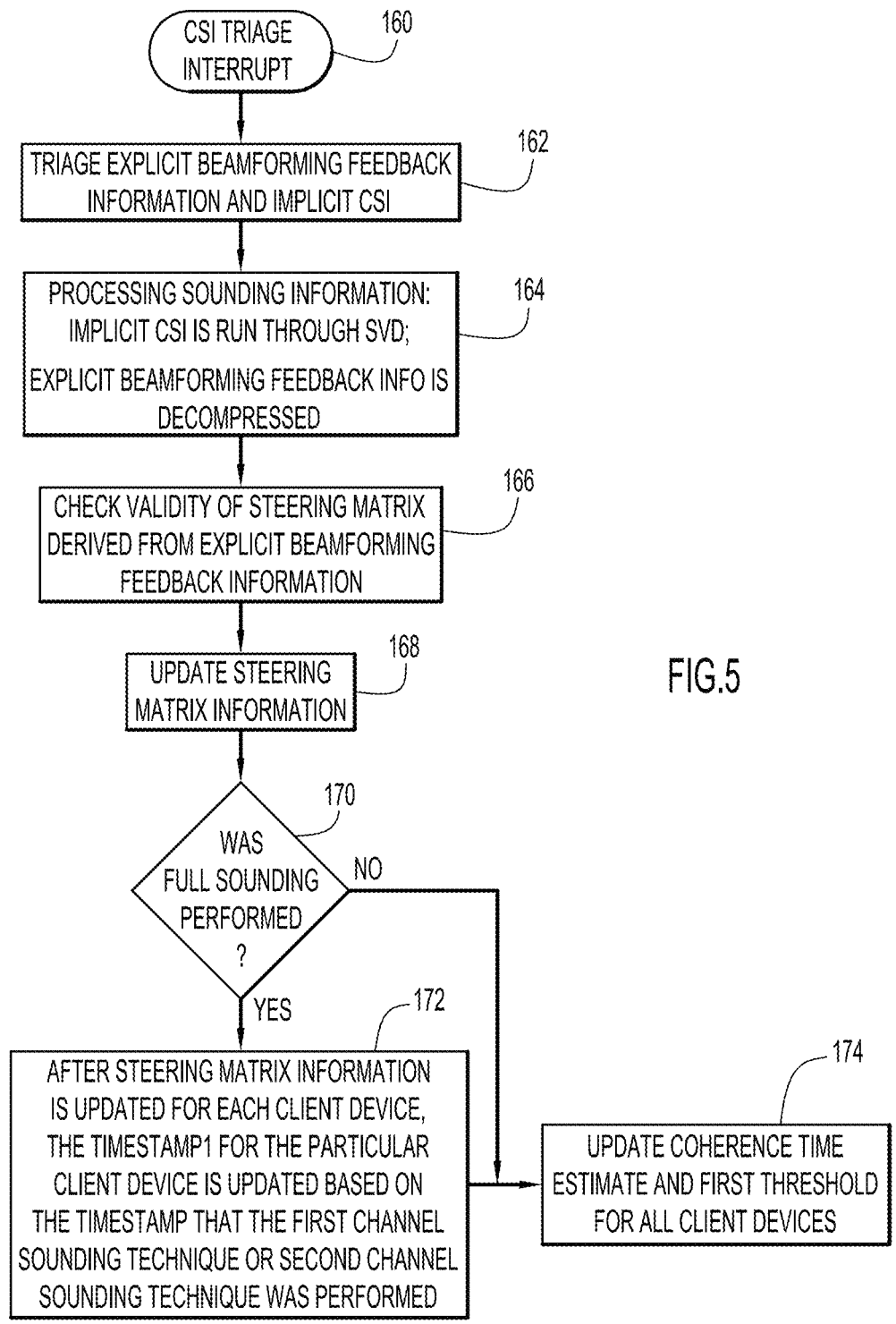
FIG. 5 is an example of a flow chart for a procedure to combine channel information from the first and second channel sounding techniques.

Reference is now made to FIG. 5 for a description of an example procedure by which an AP combines channel information derived from the first and second channel sounding techniques. Explicit beamforming feedback information, generated by a client device from the first channel sounding technique, is triaged in batches along with implicit CSI generated by the AP from received uplink transmissions. At 160, it is determined that it is time to triage explicit beamforming feedback information and implicit CSI based on a CSI Triage Interrupt event. At 162, the explicit beamforming feedback information and implicit CSI is triaged. In triage, a cost function is applied to implicit CSI and explicit beamforming feedback information. For an individual client device, the sounding technique that results from the greater number of sounded signal streams, wider frequency bandwidth and more recent timestamps is selected to be processed into a steering matrix update. For example, a cost function can be used:

$$C=a*BW+b*nSS+c*Telapsed+d(client)*isImplicit$$

where BW is the bandwidth of the channel used between the client device and access point, nSS is the number of spatial streams to be transmitted to the client device by the access point, Telapsed is the timestamp on the implicit CSI or explicit feedback minus the timestamp of the last full sounding of the client device (i.e., Telapsed=timestampLastFullSounding(client)−timestamp (CSIentry or explicit feedback)), and isImplicit takes on a value depending on whether or not the entry is implicit CSI. The variables a, b, c and d are weights or factors that can be used to tune system behavior. The "d(client)" weight is used to penalize explicit feedback for client devices that are determined to have bad explicit feedback (the client device has been flagged). In other words, the cost function used for selecting use of either explicit sounding feedback information or implicit channel state information is based on an evaluation of the explicit sounding feedback information for the particular client device.

Thus, a selection is made for use in computing updates to the steering matrix information of either the explicit sounding feedback information or the implicit CSI as a function of (using a cost function based on) the number of signal streams sounded for the wireless channel, frequency bandwidth sounded for the wireless channel and time proximity (i.e., recentness).

At 164, if the triage operation 162 selects the implicit CSI, the implicit CSI is run through a singular value decomposition (SVD) operation, an implicit phase calibration is applied in the SVD computation, and the phase calibrated SVD results are saved to/retained in memory. If the explicit beamforming feedback information is selected, it is decompressed, converted to the proper number of bits and subcarrier grouping and saved to/retained in memory. No phase calibration is applied to steering matrix information derived from the explicit beamforming feedback information. Thus, phase calibration is adaptively applied in computing the update of the steering matrix information depending on whether the explicit sounding feedback information or the channel state information is selected for use in computing the update of the steering matrix information.

For ease of reference hereinafter, the term "implicit steering matrix" refers to the steering matrix derived from the implicit CSI and the term "explicit steering matrix" refers to the steering matrix derived from the explicit beamforming feedback information.

Validity Check of Steering Matrix Derived from Explicit Beamforming Feedback Information At 166, the validity of the explicit beamforming feedback information is evaluated. After decompression of the explicit beamforming feedback information, the explicit beamforming feedback information is checked for the property $V^H V \sim = I$, where V is the steering matrix, I is the identity matrix and $^H$ is the Hermitian operation. For example, the computation:

$$10*\log 10((\text{sum}(\text{sum}(|V^H V|^2))-\text{trace}(|V^H V|2))/\text{trace}(|V^H V|^2))<XdB\_\text{orth (where } X \text{ is some threshold value)}$$

may be used to check whether the power in the diagonal elements of $V^H V$ is much greater than the non-diagonal elements. If the orthogonality test does not pass, the client device is flagged. When a client device is flagged, several actions are possible: (1) increase the first threshold (threshold1) to deprioritize that client device's explicit feedback information, (2) de-weight the explicit feedback information in the triage operation (at 162), or (3) perform both (1) and (2). Thus, the first threshold, threshold1, may be adjusted based on an evaluation of the explicit sounding feedback information for the particular client device.

The explicit steering matrix will produce the implicit CSI when received at the AP. The implicit CSI so produced represents the AP's channel estimation within the coherence time of the explicit beamforming feedback sounding. The implicit steering matrix can be compared to the explicit steering matrix, though the implicit steering matrix will likely have fewer columns, which is the reason explicit beamforming feedback sounding was needed.

The computation $|V\_\text{imp}^H V\_\text{exp}|^2$ may be used to show how much each column of the implicit steering matrix V_imp is projected into the columns of the explicit steering matrix V_exp. If the first eigenmodes of the explicit steering matrix and implicit steering matrix are not highly correlated (>0.95), the steering matrix for that client device will be flagged as potentially sub-optimal and the AP may have the restriction that only the steering matrix information resulting from a fully sounded channel is updated from explicit beamforming feedback information. For example, for a 3×3 client device, only the 3-spatial stream steering matrix will be updated, and not the steering matrix for the 2-spatial stream or single spatial stream) since the client device appears to be mixing up the eigenmodes.

At 168, the AP computes updates to the steering matrix information for all client devices that the AP is serving. At 170, it is determined whether the sounding was a full channel sounding. If a full channel sounding was made, then at 172, after the steering matrix information is updated for each client device, the timestamp1 for the particular client device is updated based on the timestamp when the first channel sounding technique or second channel sounding technique was performed. Operation 174 is arrived at either if the determination step 170 resulted in a negative determination or after operation 172. At operation 174, the coherence time estimate/first threshold is updated for all client devices of the AP.

For a given client device, the AP may compute updates to the steering matrix information from implicit CSI and from explicit beamforming feedback information. For example for a 3-spatial stream client device, a 3-spatial stream steering matrix may be computed from explicit beamforming feedback information while the steering matrix for 2-spatial streams and a single spatial stream is computed from more recent implicit CSI. Said another way, within a single user, updates to the steering matrix information may use a mix of explicit beamforming feedback information (resulting from execution of the first channel sounding technique) and implicit CSI (resulting from execution of the second channel sounding technique) such that over time some steering matrix information updates use implicit CSI and other steering matrix information updates use explicit beamforming feedback information.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   at a first wireless communication device having a plurality of antennas and capable of wirelessly communicating with one or more second wireless communication devices having one or more antennas, computing updates to steering matrix information used for beamforming one or more signal streams to a particular second wireless communication device based on a combination of a first channel sounding technique that involves an exchange of dedicated channel sounding related signals to determine channel conditions between the first wireless communication device and the particular second wireless communication device and a second channel sounding technique in which channel conditions are implicitly discovered from any signals transmitted by the particular second wireless communication device to the first wireless communication device; and determining whether a first period of time has elapsed since execution of the first channel sounding technique for the particular second wireless communication device when it is time to transmit data to the particular second wireless communication device.

2. The method of claim 1, wherein determining whether the first period of time has elapsed is based on a coherence time of a wireless channel between the first wireless communication device and the particular second wireless communication device.

3. The method of claim 1, when it is determined that the first period of time has elapsed since the first channel sounding technique has been executed for the particular second wireless communication device, further comprising:
    determining whether a second period of time has elapsed since execution of the first channel sounding technique by the first wireless communication device for any second wireless communication device; and
    executing the first channel sounding technique for the particular second wireless communication device when it is determined that the second period of time has elapsed since an explicit sounding procedure has been performed by the first wireless communication device for any second wireless communication device.

4. The method of claim 1, when it is determined that the first period of time has elapsed since execution of the first channel sounding technique for the particular second wireless communication device, further comprising:
    determining whether a second period of time has elapsed since the first channel sounding technique has been performed by the first wireless communication device for any second wireless communication device; and
    sending to the particular second wireless communication device a frame configured to trigger initiation of the first channel sounding technique or the second channel sounding technique when it is determined that the second period of time has elapsed since the first channel sounding technique has been performed by the first wireless communication device for any second wireless communication device.

5. The method of claim 1, further comprising:
    retaining explicit sounding feedback information transmitted by the particular second wireless communication device to the first wireless communication device resulting from execution of the first channel sounding technique; and
    retaining channel state information generated by the first wireless communication device resulting from execution of the second channel sounding technique.

6. The method of claim 5, further comprising selecting for use in computing updates to the steering matrix information either explicit sounding feedback information or the channel state information as a function of the number of signal streams sounded for the wireless channel, frequency bandwidth sounded for the wireless channel and time proximity.

7. The method of claim 6, further comprising adaptively applying phase calibration in computing the update of the steering matrix information depending on whether the explicit sounding feedback information or the channel state information is selected for use in computing the update of the steering matrix information.

8. The method of claim 6, further comprising adjusting a cost function used for the selecting based on an evaluation of the explicit sounding feedback information for the particular second wireless communication device.

9. The method of claim 5, further comprising adjusting the first period of time based on an evaluation of the explicit sounding feedback information for the particular second wireless communication device.

10. The method of claim 1, wherein computing comprises computing updates to the steering matrix information for the particular second wireless communication device such that over time some steering matrix information updates use information resulting from the first channel sounding technique and other steering matrix information updates use information resulting from the second channel sounding technique.

11. An apparatus comprising:
    a transceiver unit configured to transmit and receive signals via a plurality of antennas in order to wirelessly communicate with wireless client devices; and
    a processor configured to compute updates to steering matrix information used for beamforming one or more signal streams to a particular wireless client device based on a combination of a first channel sounding technique that involves an exchange of dedicated channel sounding related signals to determine channel conditions with respect to the particular wireless client device and a second channel sounding technique in which channel conditions are implicitly discovered from any signals transmitted by and received from the particular wireless client device,
    wherein the processor is further configured to determine whether a first period of time has elapsed since execution of the first channel sounding technique for the particular wireless client device when it is time to transmit data to the particular wireless client device.

12. The apparatus of claim 11, wherein the processor is further configured to determine whether the first period of time has elapsed based on a coherence time of a wireless channel with respect to the particular wireless client device.

13. The apparatus of claim 11, wherein when it is determined that the first period of time has elapsed since the first channel sounding technique has been executed for the particular wireless client device, the processor is further configured to:
    determine whether a second period of time has elapsed since execution of the first channel sounding technique for any wireless client device; and
    execute the first channel sounding technique for the particular wireless client device when it is determined that the second period of time has elapsed since an explicit sounding procedure has been performed for wireless client device.

14. The apparatus of claim 11, wherein when it is determined that the first period of time has elapsed since execution of the first channel sounding technique for the particular wireless client device, the processor is further configured to:
    determine whether a second period of time has elapsed since the first channel sounding technique has been performed for any wireless client device; and
    send to the particular wireless client device a frame configured to trigger the first channel sounding technique or the second channel sounding technique when it is determined that the second period of time has elapsed since the first channel sounding technique has been performed for any wireless client device.

15. The apparatus of claim 14, wherein the processor is further configured to:
retain explicit sounding feedback information transmitted by the particular wireless client device resulting from execution of the first channel sounding technique; and
retain channel state information generated from execution of the second channel sounding technique.

16. The apparatus of claim 15, wherein the processor is further configured to select for use in computing updates to the steering matrix information either the explicit sounding feedback information or the channel state information as a function of the number of signal streams sounded for the wireless channel, frequency bandwidth sounded for the wireless channel and time proximity.

17. The apparatus of claim 16, wherein the processor is further configured to adaptively apply phase calibration in computing the update of the steering matrix information depending on whether the explicit sounding feedback information or the channel state information is selected for use in computing the update of the steering matrix information.

18. The apparatus of claim 11, wherein the processor configured to compute updates to the steering matrix information for the particular wireless client device such that over time some steering matrix information updates use information resulting from the first channel sounding technique and other steering matrix information updates use information resulting from the second channel sounding technique.

19. One or more non-transitory computer readable storage media encoded with software comprising computer executable instructions and when the software is executed operable to:
compute updates to steering matrix information used for beamforming one or more signal streams from a first wireless communication device to a particular second wireless communication device based on a combination of a first channel sounding technique that involves an exchange of dedicated channel sounding related signals to determine channel conditions between the first wireless communication device and the particular second wireless communication device and a second channel sounding technique in which channel conditions are implicitly discovered from any signals transmitted by the particular second wireless communication device to the first wireless communication device; and
determine whether a first period of time has elapsed since execution of the first channel sounding technique for the particular second wireless communication device when it is time to transmit data to the particular second wireless communication device.

20. The non-transitory computer readable storage media of claim 19, further comprising instructions operable to:
retain explicit sounding feedback information transmitted by the particular second wireless communication device to the first wireless communication device resulting from execution of the first channel sounding technique; and
retain channel state information generated by the first wireless communication device resulting from execution of the second channel sounding technique.

21. The non-transitory computer readable storage media of claim 20, further comprising instructions operable to select for use in computing updates to the steering matrix information either explicit sounding feedback information or the channel state information as a function of the number of signal streams sounded for the wireless channel, frequency bandwidth sounded for the wireless channel and time proximity.

22. The non-transitory computer readable storage media of claim 21, further comprising instructions operable to adjust a cost function used for the selecting based on an evaluation of the explicit sounding feedback information for the particular second wireless communication device.

23. The non-transitory computer readable storage media of claim 20, further comprising instructions operable to apply phase calibration in computing the update of the steering matrix information depending on whether the explicit sounding feedback information or the channel state information is selected for use in computing the update of the steering matrix information.

24. The non-transitory computer readable storage media of claim 20, further comprising instructions operable to adjust the first period of time based on an evaluation of the explicit sounding feedback information for the particular second wireless communication device.

25. The non-transitory computer readable storage media of claim 19, wherein the instructions operable to compute comprise instructions operable to compute updates to the steering matrix information for the particular second wireless communication device such that over time some steering matrix information updates use information resulting from the first channel sounding technique and other steering matrix information updates use information resulting from the second channel sounding technique.

* * * * *